Aug. 8, 1939.　　A. J. SCAIFE　　2,168,718
CARBURETOR FLOAT VALVE
Filed July 15, 1937
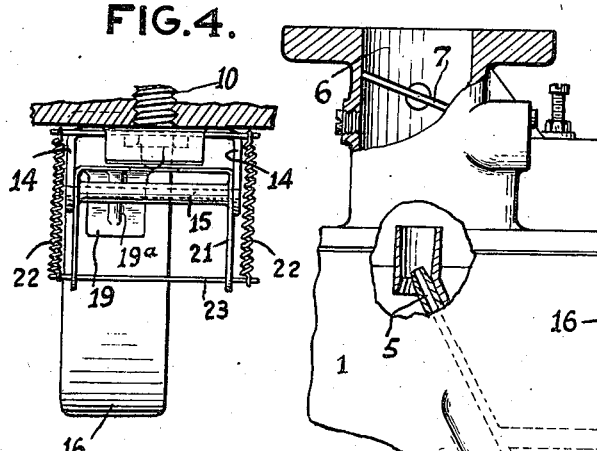
FIG. 4.
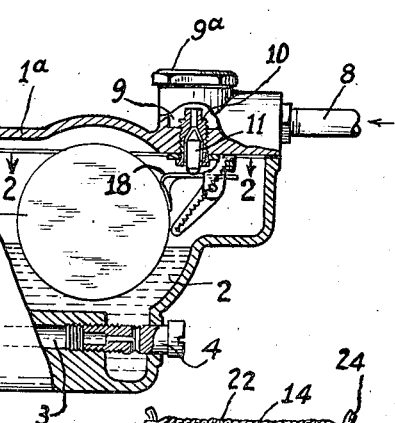
FIG. 1.
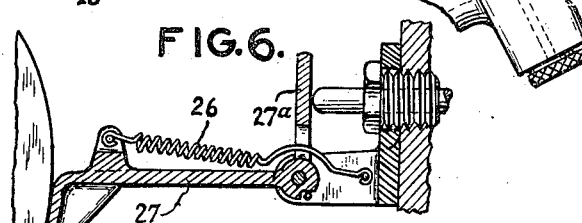
FIG. 6.
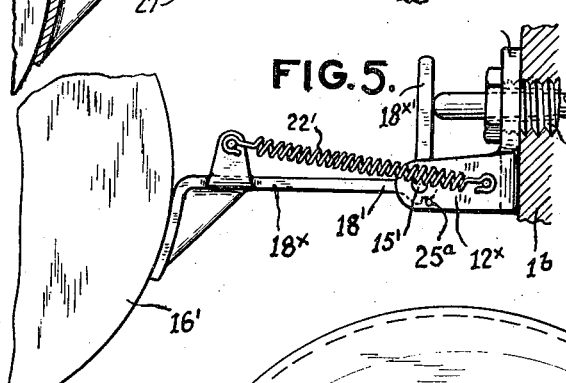
FIG. 5.
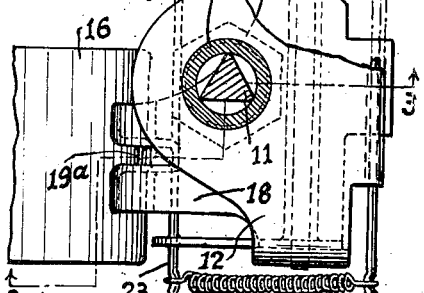
FIG. 2.
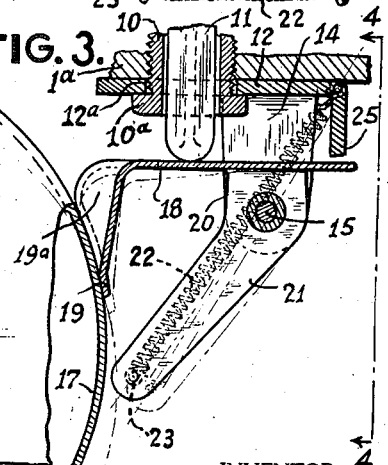
FIG. 3.
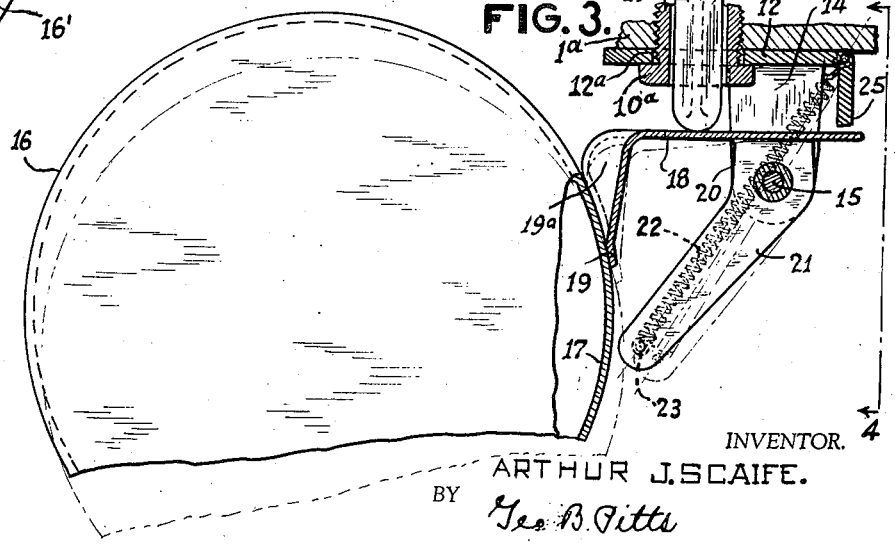
INVENTOR.
ARTHUR J. SCAIFE.
BY Geo. B. Pitts
ATTORNEY.

Patented Aug. 8, 1939

2,168,718

UNITED STATES PATENT OFFICE 2,168,718

CARBURETOR FLOAT VALVE

Arthur J. Scaife, Ardmore, Pa.

Application July 15, 1937, Serial No. 153,707

3 Claims. (Cl. 137—104)

This invention relates to carburetors, more particularly to the mechanism for controlling the supply of fuel to the float or supply chamber of the carburetor and feed thereof to and through the needle injection valve thereof. In the operation of vehicles, of both the passenger and truck types, great waste of fuel takes place due to the jolting of the vehicle; that is, the jolting of the car in traversing rough and uneven surfaces in the pavement or roadway sets up abnormal conditions in the float chamber, causing a slushing or surging back and forth, and otherwise, of the body of fuel therein, and this action of the fuel in turn vibrates the float, causing it to move away from the valve element of the fuel inlet valve. As the float is relatively light and has minimum inertia, and in all carburetors of which I have knowledge the float is free to swing about its pivot, these movements of the fuel causes the float to rapidly and suddenly vibrate to and from its valve closing position. As a result, the inlet valve is opened and admits fuel into the float chamber, increasing the supply therein, so that its normal level is raised. This increase in quantity or rise in level of the fuel obviously forces more gas into the discharge end of the fuel nozzle to be sucked into and through the venturi, than is required for the pre-designed operation of the engine, with resulting waste of fuel, increased danger of carbonization of the cylinder walls, inefficient combustion and lowered mileage of the vehicle per gallon of fuel. Where the fuel is supplied by a pump this danger of excess supply is increased since the pulsations of the pump will force the fuel into the chamber during the periods when the float is vibrated away from the valve element.

In vehicles, such as trucks, where the mileage per gallon is relatively low, for example, two to eight miles to the gallon, any increased mileage even as low as one-eighth of a mile to a gallon of fuel, due to control of the fuel level in the float or supply chamber, is highly advantageous, as effecting a substantial saving in fuel cost, especially in the operation of a fleet of trucks for any predetermined period of time.

My invention has for its object the provision of improved means for controlling the supply of fuel through the inlet valve and fuel level in the float chamber of a carburetor to avoid waste of fuel in the operation of a motor vehicle of the internal combustion engine driven type.

Another object of the invention is to provide in the float chamber of a carburetor an improved control means for the float operable to prevent swinging movement thereof due to jolting, rocking and jerks of the vehicle incident to its movement over a highway, while permitting the rise and fall of the float, due to fuel consumption and re-supply of fuel, to the end that the fuel level is maintained substantially constant.

Another object of the invention is to provide for a carburetor, an improved fuel supply means having a spring controlled float so arranged that the torque action exerted by the spring on the float is greatest when the float is in valve closing position to resist vibration or oscillation and decreases or diminishes as the float gravitates due to drop in the fuel level to provide for all demands for fuel in the operation of the vehicle.

A further object of the invention is to provide for the carburetor of an engine an improved fuel supply means of simple construction and operable to insure a substantially uniform fuel level in the float chamber under varying driving conditions of the vehicle on which the carburetor is mounted.

Other objects of the invention will be apparent to those skilled in the art to which my invention relates from the following description taken in connection with the accompanying drawing, wherein Fig. 1 is a side view of a carburetor, partly in section and partly in elevation, embodying my invention.

Fig. 2 is a fragmentary section on the line 2—2.

Fig. 3 is a section on the line 3—3 of Fig. 2.

Fig. 4 is a fragmentary view on the line 4—4 of Fig. 3.

Figs. 5 and 6 are fragmentary views showing modified forms of construction.

In the drawing, 1 indicates as an entirety a carburetor adapted to be mounted on or in operative relation to an internal combustion engine (not shown) which in turn is arranged to drive a vehicle. The carburetor is shaped to provide a fuel supply chamber 2 connected to a conduit 3, by a metering device 4, the conduit being connected to a discharge jet 5 which is disposed in operative relation to the usual venturi in the outlet conduit 6. The air supply to the venturi is not shown. The choke valve (not shown) and butterfly valve 7 are operated in the usual manner. The fuel, such as gasoline, is conveyed from a suitable source to the carburetor 1 through a pipe 8. The pipe 8, in modern vehicle construction, leads from a suitable pump which is driven by the engine and serves to supply the fuel under a predetermined pressure. The pipe 8 is connected to a chamber 9 provided on the upper wall 1a of the carburetor. A plug 9a serves to permit access to the chamber 9. The wall 1a is formed with a threaded opening in which is mounted the seat element 10 for a valve element 11, these elements being of the needle valve type. The valve seat element 10 projects into the chamber 9 and permits the use therein of a screen (not shown) over and around the seat element 10.

The parts above described may be of any desired construction and arrangement.

12 indicates a bracket having a base portion 13 and depending side members 14, which support the opposite ends of a shaft 15. The bracket 12 is fixed to the lower face of the wall 1a in any desired manner, but in the preferred arrangement it is formed with an opening 12a and the valve seat element 10 is extended therethrough and tightened in its opening in the wall 1a to rigidly clamp the base portion 13 between the flange 10a of the element 10 and wall 1a. 16 indicates a float which operates in the supply chamber 2 due to rise and fall of the fuel therein under control of a spring tension means hereinafter referred to, to operate the in-take fuel valve, whereby the body of fuel is maintained at substantially a predetermined level in relation to the discharge end of the jet 5. The float 16 preferably consists of a sealed casing formed of relatively thin sheet metal stock and having end walls and an annular side wall 17 to which is secured an arm 18 also by preference, formed of sheet metal stock. The arm 18 has an angle portion 19 at its outer end secured to the side wall 17 in any desired manner, such portion being embossed as shown at 19a for reinforcement purposes. Adjacent its inner end the arm 18 is provided with depending ears 20 having openings through which the shaft 15 extends to pivotally mount the arm on the bracket 12. A sleeve which surrounds the shaft 15, is connected at its opposite ends to the ears 20 to space and support them in fixed relation to the arm 18 to insure free pivotal movement of the latter. In the arrangement shown, the float 16, through the engagement of the arm 18 with the valve element 11, maintains the latter seated, when the fuel level is at the predetermined level as shown in Figs. 1 and 3 and gravitates downwardly (see dotted lines in Fig. 3) as the fuel is consumed to permit opening of the inlet valve, whereby the fuel is maintained at a substantially predetermined level.

To insure this substantially uniform fuel level and avoid waste of fuel because of the abnormal conditions, hereinbefore referred to, to which the body of fuel in the supply chamber is subjected, I provide means for biasing the float 16 upwardly, but connected thereto in relation to the pivot about which the float swings so as to effect an increasing torque action thereon in its upward movement and a decreasing torque action in its downward movement. For this purpose, the ears 20 are provided with integral extensions 21 to which are connected the corresponding ends of coiled expansion springs 22, such connection being preferably provided by means of a rod 23 mounted in the outer ends of the extensions 21. The opposite ends of the springs 22 are fixedly connected to the opposite ends of a rod 24, which is preferably mounted in an opening formed in the rear end of the bracket, this arrangement providing for the entire assembly of all parts on the bracket 12 and mounting thereof on the wall 1a by the valve seat element 10, as already set forth. The rear end of the bracket 12 may be provided with an integral down-turned lug 25 to form a stop for the tail-end of the arm 18 to limit the downward movement of the float 16 for a purpose later to appear. It will be noted that the extensions 21 are in angular relation to the ears 20 and that the fixed connections for the ends of the springs remote from the extensions 21 are so positioned that the springs 22, when the float 16 is in valve closing position, lie in a plane slightly to one side of the axis of the pivot 15 and swing into a plane cutting such axis when the float gravitates to its limit of movement as determined by the stop 25. It will thus be seen that the leverage between the connections of the springs with the extensions 21 and the axis about which the latter swing increases as the float rises and decreases as the float gravitates, so that while the spring tension slightly decreases in the upward movement of the float and increases slightly in the downward movement thereof, the torque effort to swing the float varies in such movement and increases as the float swings upwardly, the torque action being greatest when the float is in valve closing position. In this arrangement it will be noted (a) that the torque action exerted by the springs is greatest when the float is in valve closing position, the effect of which is to prevent vibration of the float and opening of the inlet valve, so that additional fuel is not admitted to the fuel chamber incident to the jolting of the vehicle and (b) that the torque action on the extension 21 decreases as the plane of the springs approach the axis of the pivot for the extension and in such position the torque becomes nil. The springs 22 are relatively light and long and the extensions 21 are so disposed with respect to the ears 20 that the ends of the springs connected to the extensions move through an arc struck on a long radius, being limited at the position where the arm 18 seats the valve element 11; accordingly, the arrangement is such as to provide sufficient tension on the float 16 to overcome those momentary forces incident to the surging of the fuel in the chamber 2 without limiting or affecting to any substantial degree the gravitation of the float due to drop in the fuel level. In other words the springs 22 serve to increase the inertia of the float against sudden vibrations or impulses by reason of the fuel agitation incident to travel of the vehicle, or movement of rubber mounted engine. As a result, a substantially uniform level of fuel is maintained in the chamber 2 and waste of fuel is therefore avoided.

In the arrangement shown in Figs. 1 to 4, inclusive, the springs are disposed on the opposite outer sides of the depending members 14 and are therefore free to swing from one position to the other. In Fig. 5 I have shown a modified form of construction wherein the fuel inlet valve 10' and supporting bracket 12' are mounted on the side wall 1b and the arm 18' connected to the float 16' is in the form of a bell-crank pivoted at 15' to an integral arm or lug 12x extending laterally from the bracket 12', so that one arm 18x of the bell-crank is connected to the float and its other arm 18x' engages with and operates the needle valve element of the valve 10'. In this arrangement one end of each of the springs 22' is fixed to the lug 12x and its other is connected to an up-standing lug on the outer end portion of the bell-crank arm 18x, these connections being related so as to position the springs 22' slightly to one side, that is, above the axis of the pivot 15' when the float is in valve closing position and permit the springs to swing into a plane cutting such axis, at which position the bell-crank is stopped by a stop 25a.

In Fig. 5 two springs 22' (one only is shown) at opposite sides of the bell-crank 18' are employed; whereas in Fig. 6 one spring 26 is employed. In this latter form of construction the spring is arranged centrally of the bell-crank 27 and its inner end extends through an opening formed in the bell-crank arm 27a.

As the liquid fuel enters the float chamber the float will rise and move the float supporting arm about its pivot with the spring to one side thereof. This in turn puts a slight pull on the arm and as the float approaches the pre-determined level the pull or pressure increases until the float is at the valve seated position. When the valve is closed the springs are applying maximum pressure or pull on the arm. This pressure controls the float action and holds it steady against the rocking or vibrating influence of the fuel in the float chamber, caused by the vehicle movement over the highway or the rocking of the flexibly mounted engine incident thereto, and hence prevents an excessive supply of fuel to the chamber 2 with resultant waste of fuel. The spring pressure on the float carrying arm will also resist the pulsatory and excess pressure of the fuel pump, to prevent rise of the fuel level under the conditions herein referred to. On the other hand, drop of the fuel level due to consumption thereof, permits the float to gravitate and as the leverage between the connection for the springs, and the axis for the float carrying arm diminishes in the downward movement of the float, the latter takes care of normal as well as maximum demands for fuel under all conditions.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a carburetor having a float chamber for liquid fuel and a fuel inlet valve therefor, of means for controlling said valve to maintain the liquid fuel in said chamber at a predetermined level, said means comprising a stop, a pivotally mounted arm carrying a float arranged to swing said arm about its pivot pin due to rise and fall of the liquid in said chamber to and from said predetermined level, a portion of said arm being arranged to engage the valve element of said valve to close the latter and limit the movement of said float in one direction and another portion of said arm being arranged to engage said stop to limit the movement of said float in the opposite direction, and spring tension means connected to said arm and the wall of said chamber upon opposite sides of the pivot pin for said arm and disposed at one side of the plane of the pivot pin cutting said connection of said tension means with said wall and normally tending to exert tension on said arm toward the valve closing position throughout its range of movement.

2. A carburetor comprising a housing having a float chamber for liquid fuel, a fuel inlet valve having a movable valve element, an arm, means for pivotally supporting said arm within said housing, a float attached to said arm and adapted to swing the latter about its pivot upon rise and fall of the fuel level in said chamber, said movable valve element being operatively associated with said arm in such a manner that in normal operation said movable valve element always moves in direct relation to the movement of said float, means for limiting the movement of said arm about its pivot in a direction to open said valve, and spring tension means of substantially uniform tension throughout the range of movement of said arm connected to said arm at one side of its pivot and to said housing at the other side of said pivot and normally always tending to move said arm in a direction to raise said float whereby movement of said float due to surging of the fuel in said chamber is prevented.

3. A carburetor comprising a housing having a float chamber for liquid fuel, a fuel inlet valve having a movable valve element, an arm, means for pivotally supporting said arm within said housing, a float attached to said arm and adapted to swing the latter about its pivot upon rise and fall of the fuel level in said chamber, means for operatively associating said arm with said movable valve element so that said movable valve element always moves in direct relation to the movement of said float during normal operation, means for limiting the movement of said arm about its pivot in a direction to open said valve, and spring tension means of substantially uniform tension throughout the range of movement of said arm and acting along a line adjacent said pivot and connected to said arm at one side of said pivot and to said housing at the other side of said pivot and always tending to move said arm in a direction to raise said float whereby movement of said float assembly due to surging of the fuel in said chamber is prevented.

ARTHUR J. SCAIFE.